United States Patent [19]

Riedel

[11] 4,255,932
[45] Mar. 17, 1981

[54] TANDEM MASTER CYLINDER

[75] Inventor: Peter Riedel, Hattersheim, Fed. Rep. of Germany

[73] Assignee: ITT Industries, Inc., New York, N.Y.

[21] Appl. No.: 39,638

[22] Filed: May 16, 1979

[30] Foreign Application Priority Data

Jul. 10, 1978 [DE] Fed. Rep. of Germany ....... 2830223

[51] Int. Cl.³ ............................................. B60T 11/20
[52] U.S. Cl. ...................................... 60/562; 60/561; 60/591; 303/6 C
[58] Field of Search ................ 60/562, 574, 591, 561, 60/576, 581; 303/6 C

[56] References Cited

U.S. PATENT DOCUMENTS

| 3,926,476 | 12/1975 | Mathues | 60/582 |
| 3,972,192 | 8/1976 | Muterel | 303/6 C |
| 4,078,384 | 3/1978 | Shutt | 60/562 |

Primary Examiner—Abraham Hershkovitz

Attorney, Agent, or Firm—John T. O'Halloran; Alfred C. Hill

[57] ABSTRACT

In a known tandem master cylinder with two regulators for use in vehicles using diagonally split brake circuits, machining and assembly of the components is time consuming which makes the device expensive to manufacture. Moreover, the arrangement is only realizable with master cylinders having a relatively large diameter. There are also functional disadvantages, particularly that in the event of failure of a brake circuit the fluid volume consumption of the other brake circuit is materially increased which further increases the brake pedal travel. To eliminate these shortcomings, the tandem master cylinder with two regulators of the present invention includes means which, in the event of failure of a brake circuit, the regulator valve of the other brake circuit is actuated mechanically by one of the pressure pistons so that the regulator valve of the intact brake circuit is kept open to enable unreduced braking pressure to be coupled to the intact brake circuit.

21 Claims, 1 Drawing Figure

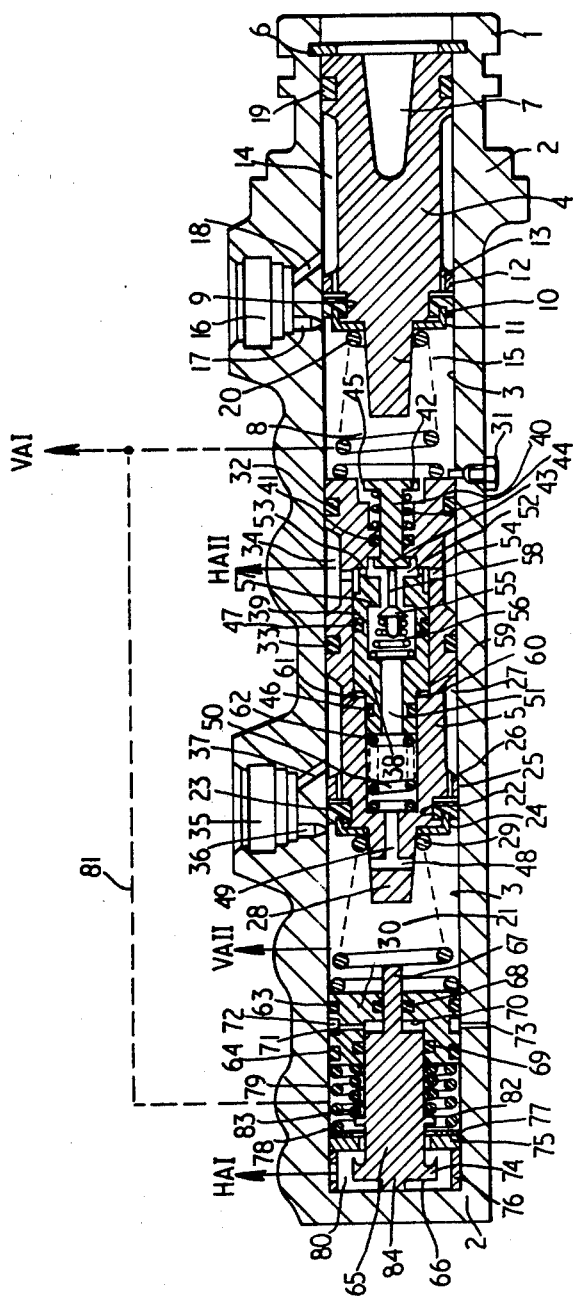

TANDEM MASTER CYLINDER

BACKGROUND OF THE INVENTION

This invention relates to a dual circuit vehicle hydraulic brake system and more particularly to a tandem master cylinder for such a system.

German Patent DE-OS 2,604,663 discloses a master cylinder for a vehicle hydraulic brake system which is connected with the front-wheel and rear-wheel brakes through brake piping and includes, in a stepped bore of a housing, two telescoping pressure pistons slidable in the housing bore. Each pressure piston forms with an annular surface a boundary for a pressure chamber in which there is disposed a port for a fluid conduit leading to the front-wheel brakes. A first of the pressure pistons has a multiple stepped circumferential surface, with the ends of the piston being of a smaller diameter, one end being guided in the smaller step of the housing bore and the other end being guided in a coaxial bore in the second pressure piston. The first pressure piston includes a coaxial bore in which two stepped pistons are located close to the piston ends, each stepped piston being loaded by an associated control spring. With their smaller steps, the stepped pistons form a boundary for a regulator input which is in communication with the above-noted pressure chamber, and with their larger steps, they form a boundary for a regulator output which, where applicable, is connected with a fluid port for the rear-wheel brakes through suitable fluid passageways.

Each stepped piston is assigned a valve, and the closure members of these valves are secured to the ends of an operating piston. The operating piston is disposed in the coaxial bore of the first pressure piston between the two stepped pistons and is subjected to the unregulated pressure of the one brake circuit on its one end and to the unregulated pressure of the other brake circuit on its other end. When the brake is applied, closing of the valves will occur above a predetermined pressure, and a reduced brake pressure will be supplied to the rear-wheel brakes, while the front-wheel brakes will be subjected to the unreduced pressure.

If one brake circuit fails, the differential of pressure acting on the operating piston will cause actuation of the operating piston, thereby preventing closing of the valve in the intact brake circuit so that there occurs no reduction of the brake pressure for the rear-wheel brake.

The arrangement known from the above cited German Patent is costly from the point of view of machining and assembly because it necessitates a large number of individual components which are sometimes of complicated construction. From this results high manufacturing costs. Moreover, such a design is only realizable with master cylinders having a relatively large diameter, because the brake pressure for the front-wheel brakes can only be produced in the annular chambers bounded by the pressure pistons and not on a cross-sectional area corresponding to the piston diameter.

In the event of failure of a brake circuit, the lost travel of the brake pedal is increased considerably because pressure is not built up in a pressure chamber. This increased pedal travel is increased still further as a result of the displacement of the operating piston and the high brake fluid consumption caused thereby. In the event of failure of a brake circuit, in which case it is important to achieve the best possible braking effect with the intact brake circuit, pressure can be built up in the brake system only after the sum of the additional lost pedal travels has been overcome.

The operating piston is only actuated in the event of a defect of the brake system, the ring seals sealing the operating piston are therefore not normally moved. It is, however, known that seals which are not moved over a prolonged period of time are destroyed when suddenly loaded. It is then necessary to repair the master cylinder.

SUMMARY OF THE INVENTION

It is, therefore, an object of the present invention to provide a tandem master cylinder of the type referred to hereinabove, which does not have the shortcomings of the known arrangements, permits a high braking effect to be achieved with the intact brake circuit if the other brake circuit has failed while maintaining a relatively short lost pedal travel, and is characterized by simple construction and reliable operation of all parts. In addition, the manufacturing costs of the entire arrangement are lower than in the known design.

A feature of the present invention is the provision of a tandem master cylinder for a vehicle hydraulic brake system comprising: a first pressure piston; a second pressure piston in line with and spaced from the first pressure piston; a first pressure chamber disposed between the first and second pressure pistons and coupled to a front wheel brake of one of two brake circuits; a second pressure chamber bounded by an end of the second pressure piston remote from the first pressure piston and coupled to a front wheel brake of the other of the two brake circuits; a first regulator associated with the first pressure chamber and coupled to a rear wheel brake of the one of the two brake circuits, the first regulator having a first stepped piston loaded by a first control spring and a first valve; a second regulator associated with the second pressure chamber and coupled to a rear wheel brake of the other of the two brake circuits, the second regulator having a second stepped piston loaded by a second control spring and a second valve; and means which, in the event of failure of one of the one and the other of the two brake circuits, one of the first and second valves in the other of the one and the other of the two brake circuits is actuated mechanically by one of the first and second pressure pistons to thereby keep the one of the first and second valves in an open position.

The essential advantages of the tandem master cylinder of the present invention are that it is of simple construction, reliable operation and permits a reduced-diameter design. Moreover, the manufacturing costs are materially lower and the weight is lower than in known arrangements. Three features contribute particularly to its reliable operation:

1. All movable parts and their seals are loaded on each braking action which keeps the seals soft;
2. The blocking device is actuated mechanically in the event of failure of a brake circuit; and
3. The actuation of the blocking device does not result in the consumption of brake fluid which helps to maintain the lost pedal travel small.

In a preferred improvement of the present invention, the housing of the tandem master cylinder includes a smooth bore in which the pressure pistons and the first regulator are arranged in tandem and the second regulator is arranged in the interior of the second pressure piston. This results in a space- and weight- saving arrangement. The means for mechanically actuating the valves are suitably an extension of the first pressure piston projecting into the first pressure chamber and an extension of the second pressure piston projecting into the second pressure chamber. This design is straightforward and safe.

In an advantageous embodiment of the present invention, at least one of the valves is provided with a control device subjected to the pressure prevailing in the pressure chamber associated with the other brake circuit, and the control device comprises a piston and a spring, the piston being loaded by the spring in opposition to its mechanical actuating direction. During normal function of the tandem master cylinder, the piston operates as a control piston, acting on the tappet of the valve-closure member, while it operates as a blocking device in the event of failure of a brake circuit.

In a preferred embodiment of the regulator valve, the stepped piston houses a valve-closure member bearing through a tappet against a radially enlarged end of the piston. Thus, the valve is actuated by the movement of both the stepped piston and the other piston.

To achieve a safe blocking function of the piston in the event of failure of a brake circuit, it is proposed to arrange for the maximum displacement travel of the stepped piston to be larger than the closing travel of the valve, and to arrange for the displacement travel of the blocking piston to be larger than the difference between the displacement travel of the stepped piston and the travel required for closing of the valve.

The stepped piston of the first regulator is suitably held in a sleeve arranged in the bore and secured to the housing. The sleeve does not only hold the stepped piston, it also serves as a support for several springs and is at the same time a partition wall between the second pressure chamber and the regulator inlet chamber of the first regulator. In a very simple and space-saving design of the first regulator, the larger step of the stepped piston is formed as a valve-closure member, and the valve seat is a ring situated above the smaller step of the stepped piston. The stepped piston has advantageously on its smaller step a peg-shaped end extending into the second pressure chamber, with a stop means being provided on the larger step. In the event of a failure of the second brake circuit, the second pressure piston shifts an amount until it abuts against the peg-shaped end of the stepped piston, holding the latter with its stop against the front wall of the housing. This has the advantage that the stepped piston of the first regulator is not moved at all in the event of failure of the second brake circuit so that the fluid volume in the first brake circuit is not increased. In a preferred embodiment of the first regulator, the ring serving as a valve seat bears, on the side close to the regulator outlet chamber, against the housing's front wall by the intermediary of a spacer ring and, on the other side against the sleeve secured to the housing, by the intermediary of a washer and a spring. This arrangement determines the position of the ring and the valve-closing travel, respectively, in addition to ensuring reliable opening of the valve when the pressure in the regulator inlet chamber is reduced which occurs, for example, when the brake pedal is released.

Since the second pressure piston forms the regulator housing for the second regulator and the regulator housing is displaced relative to the port of the fluid conduit leading to a rear-axle brake when the brake is applied, it is advantageous for the transmission of fluid that the second pressure piston includes an annular chamber which is in permanent communication with a regulator outlet chamber and with a wheel brake cylinder of a rear-wheel brake.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a tandem master cylinder with regulators for a diagonally split dual-circuit brake system in accordance with the principles of the present invention.

DESCRIPTION OF THE PREFERRED EMBODIMENT

In the FIGURE, numeral 1 identifies a tandem master cylinder comprising essentially a housing 2 with a bore 3 and a first pressure piston 4 and a second pressure piston 5. First pressure piston 4 is secured by means of a ring 6 located in bore 3 close to the bore's end and fastened to housing 2. First pressure piston 4 has on its end close to ring 6 a conical opening 7 which is engaged by the end of a push-rod (not shown) extending from the brake pedal. The other end of first pressure piston 4 forms a boundary for a first pressure chamber 8 which is connected with a wheel brake cylinder, not shown in the drawing, of a front wheel. This is indicated by arrow VA I.

First pressure piston 4 has a cylindrical step 9 on which a collar seal 10 with a support ring 11 is arranged, collar seal 10 abutting against a shoulder 12 of pressure piston 4. Shoulder 12 includes several parallel openings 13 extending from the abutment side of collar seal 10 into an annular chamber 14. A conical extension 15 of pressure piston 4 projects into first pressure chamber 8.

Housing 2 accommodates a bore 16 to receive a reservoir connector from which a feed port 17 and a compensating port 18 open into bore 3, the feed port 17 terminating in pressure chamber 8 directly in front of collar seal 10 and compensating port 18 terminating in annular chamber 14. In its portion adjacent to ring 6, first pressure piston 4 is provided with a seal 19 which rests against the inner wall of bore 3. Conical extension 15 is received in a compression spring 20 bearing with one end against support ring 11 and with its other end against second pressure piston 5. The end surface of second pressure piston 5 against which spring 20 bears forms a boundary for first pressure chamber 8 while the other piston end surface forms a boundary for a second pressure chamber 21 which connects with a wheel brake cylinder, not shown in the drawing, of the other front wheel. This is indicated by arrow VA II.

Second pressure piston 5 has a cylindrical step 22 on which a collar seal 23 with a support ring 24 is arranged, collar seal 23 abutting against a shoulder 25 of pressure piston 5. Shoulder 25 includes several parallel bores 26 extending from the abutment side of collar seal 23 into an annular chamber 27. A conical extension 28 of second pressure piston 5 projects into second pressure chamber 21. Second pressure chamber 21 houses a compression spring 29 which is engaged between a sleeve 30 disposed in bore 3 and fastened to housing 2 and support ring 24. Sleeve 30 may be secured to housing 2, for example, by means of a screw engaging sleeve 30 through housing 2.

Housing 2 accommodates a screw 31 extending into first pressure chamber 8 and serving to limit the return movement of second pressure piston 5. Provided close to the end of second pressure piston 5, which end bounds first pressure chamber 8, is a seal 32 and, approximately in the middle of the piston length, another seal 33, the seals sealing pressure piston 5 relative to housing 2. Annular chamber 27 is disposed between collar seal 23 and seal 33, and another annular chamber 34 is disposed between seals 32 and 33.

Housing 2 includes a second bore 35 to receive a second fluid reservoir connector from which a feed port 36 and a compensating port 37 open into bore 3, feed port 36 terminating in pressure chamber 21 directly in front of collar seal 23 and compensating port 37 terminating in annular chamber 27.

Second pressure piston 5 includes a multiple stepped bore accommodating in its middle part a stepped piston 38 of a regulator 39 and in its part close to pressure chamber 8 a piston 40 which, because of its function, is referred to as a blocking piston in the following. Blocking piston 40 is sealed relative to the bore wall by means of a seal 41. The ends 42 and 43 of blocking piston 40 have radial extensions serving to limit its axial movement. A helical spring 44 is engaged between a step of the bore of second pressure piston 5 and end 42 and bears upon blocking piston 40 in the direction of first pressure chamber 8 whereby in the inactive position of the arrangement end 42 is held at a specific distance from a stop 45.

Stepped piston 38 is sealed relative to second pressure piston 5 by means of two seals 46 and 47. A radial bore 48 and an axial fluid passageway 49 in extension 28 of pressure piston 5 connect second pressure chamber 21 with a regulator inlet chamber 50 which is bounded by the end surface of the smaller step of stepped piston 38. A coaxial fluid passageway 51 in the interior of stepped piston 38 connects regulator inlet chamber 50 with a regulator outlet chamber 52 which is bounded by the end surface of the larger piston step. On the end surface of the larger piston step, stop means 53 are provided through which stepped piston 38 bears against a step of the bore of pressure piston 5. Fluid orifices 54 disposed radially in pressure piston 5 connect regulator outlet chamber 52 with annular chamber 34 which connects with a wheel brake cylinder, not shown in the drawing, of a rear wheel. This is indicated by arrow HA II.

Fluid passageway 51 houses a valve-closure member 55 which is loaded against a valve seat 57 by a spring 56. Valve-closure member 55 includes a tappet 58 which extends out of stepped piston 38 and bears against end 43 of blocking piston 40.

An annular surface of the larger step of the stepped piston 38 forms a boundary for an annular chamber 59 whose opposite wall forms a stop 60 limiting the travel or displacement of stepped piston 38. Annular chamber 59 is connected with the annular chamber 27 through a radial bore 61. The smaller step of stepped piston 38 is loaded by a control spring 62 which with its other end bears against a front wall of the bore of second pressure piston 5.

By suitably dimensioning the spring force of control spring 62 and the effective surfaces of blocking piston 40, it is possible to influence the control of the regulator valve and thus the regulator's behavior. This can only be achieved because the pressure differential between the pressures prevailing in first pressure chamber 8 and in regulator outlet chamber 52 acts on blocking piston 40.

Sleeve 30 is sealed relative to bore 3 by means of two seals 63 and 64. Sleeve 30 includes a stepped bore in which a stepped piston 65 of a regulator 66 is carried slidably with a peg-shaped end 67 and sealed by means of seals 68 and 69. Peg-shaped end 67 extends into pressure chamber 21 which is bounded by sleeve 30. A hollow space 70 which is formed between sleeve 30 and peg-shaped end 67 is connected with an annular chamber 72 disposed between seals 63 and 64 through a radial bore 71. Annular chamber 72 connects with atmosphere by means of an opening 73.

The larger step of stepped piston 65 forms a valve-closure member 74 located at a small distance from an annular valve seat 75 disposed in bore 3. Valve seat 75 bears against the front of housing 2 through a spacer ring 76. On the other side of valve seat 75 is a washer 77 on which a spring 78 bearing against sleeve 30 acts in the direction of valve seat 75.

The side of valve seat 75 close to the smaller piston step bounds a regulator inlet chamber 79, the other side of valve seat 75 bounds a regulator outlet chamber 80. Regulator outlet chamber 80 is connected with a wheel brake cylinder, not shown in the drawing, of a rear wheel. This is indicated by arrow HA I. The regulator inlet chamber 79 is connected with first pressure chamber 8 by means of a fluid conduit 81.

On its smaller step stepped piston 65 has a radial projection 82. Engaged between projection 82 and sleeve 30 is a control spring 83 which acts upon stepped piston 65 in the direction of regulator outlet chamber 80, with a stop means 84 disposed on the end surface of the larger piston step being thereby urged into abutment with the front wall of housing 2 in the inactive position.

The mode of operation of the tandem master cylinder illustrated in the drawing shall first be described for the case of both brake circuits being intact.

When the brake pedal is depressed, first pressure piston 4 is moved against compression spring 20 and second pressure piston 5 is moved against compression spring 29, whereby collar seals 10 and 23 overtravel feed ports 17 and 36 and close pressure chambers 8 and 21. The pressure produced in first pressure chamber 8 propagates through a brake pipe up to a wheel brake cylinder VA I of a front wheel, and, through fluid conduit 81, to regulator inlet chamber 79 of first regulator 66. The pressure generated in second pressure chamber 21, which is of the same magnitude as the pressure in first pressure chamber 8 because the surfaces are of equal size, is passed through a brake pipe to the wheel brake cylinder VA II of the other front wheel and, through radial bore 48 and axial fluid passageway 49, to regulator inlet chamber 50 of second regulator 39.

Since the force of compression spring 83 keeps stepped piston 65 of first regulator 66 in its end position close to regulator outlet chamber 80, stop means 84 thereby abutting the front wall of housing 2, the valve is open and fluid is passed from regulator inlet chmaber 79 to regulator outlet chamber 80 unhindered. The pressure prevailing in regulator outlet chamber 80 is transferred through a brake pipe to the wheel brake cylinder HA I of a rear wheel. Stepped piston 38 of second regulator 39 is initially urged, with stop means 53, against a step in the bore of second pressure piston 5 by the force of control spring 62, as a result of which tappet 58 of valve-closure member 55 abuts end 43 of blocking piston 40, the valve is open and fluid flows from regulator inlet chamber 50 into regulator outlet chamber 52 unhindered. The pressure prevailing in regulator outlet chamber 52 propagates through fluid orifices 54, annular chamber 34 and fluid conduits to the other wheel brake cylinder HA II of the rear-wheel brake.

When the pressure has reached a predetermined level, which level is to be the same for both brake circuits—this may be achieved by suitably dimensioning the effective surfaces of the stepped pistons and the force of the control springs—regulator valves 39 and 66 will close concurrently, and a pressure reduction will occur on the regulator output side. This process will be described for each of the two regulators separately.

When the pressure has reached the predetermined level, stepped piston 65 of first regulator 66 is shifted against control spring 83 until closure member 74 closes the fluid passageway from regulator inlet chamber 79 to regulator outlet chamber 80 by seating engagement with valve seat 75. With the pressure in pressure chamber 8 continuing to increase, the front-wheel brake VA I is supplied with an unreduced brake pressure, while the rear-wheel brake HA I receives a reduced brake pressure. With the pressure in regulator inlet chamber 79 increasing correspondingly—the pressure prevailing therein is always unreduced—stepped piston 65 is moved in the direction of regulator outlet chamber 80. Valve-closure member 74 is thereby lifted off its valve seat 75 and fluid is allowed to flow from regulator inlet chamber 79 into regulator outlet chamber 80. The stepped piston 65 then moves again against control spring 83.

When the pressure has reached the predetermined level, stepped piston 38 of second regulator 39 is shifted against control spring 62 until closure member 55 closes fluid passageway 51 by seating engagement with valve seat 57. With the pressure in pressure chamber 21 continuing to increase, the front-wheel brake VA II is supplied with an unreduced brake pressure, while the rear-wheel brake HA II receives a reduced pressure. With the pressure in regulator inlet chamber 50 increasing correspondingly, stepped piston 38 is moved in the direction of blocking piston 40. The valve is opened by tappet 58 which bears again against end 43 of blocking piston 40, and fluid is allowed to flow from regulator inlet chamber 50 into regulator outlet chamber 52. Stepped piston 38 then moves again against control spring 62.

If the first brake circuit VA I, HA I fails because of a defect, operation of the brake pedal will cause shifting of first pressure piston 4 against compression spring 20 until conical extension 15 urges end 42 of blocking piston 40 against stop 45. A pressure will be generated in the second pressure chamber 21 which, as described previously, is delivered, through second regulator 39 and fluid conduits, to the wheel brake cylinder HA II of the rear axle. Though stepped piston 38 is displaced against control spring 62 until it is in abutment with stop 60, the valve cannot close because blocking piston 40 is in its end position close to regulator 39. Thus, in the event of failure of the first brake circuit, the unreduced pressure is not only supplied to the wheel brake cylinder VA II of the front wheel, but also to the wheel brake cylinder HA II of the rear wheel.

Conversely, if the second brake circuit VA II, HA II fails because of a defect, depression of the brake pedal causes shifting of second pressure piston 5 against compression spring 29 until conical extension 28 is in abutment with peg-shaped end 67 of stepped piston 65. Stepped piston 65 is thereby urged, with its stop 84, against the front wall of housing 2, and valve 66 cannot close. Thus, the pressure produced in first pressure chamber 8 is delivered to the wheel brake cylinder VA I of the front wheel and to the wheel brake cylinder HA I of the rear wheel unreduced.

While I have described above the principles of my invention in connection with specific apparatus it is to be clearly understood that this description is made only by way of example and not as a limitation to the scope of my invention as set forth in the objects thereof and in the accompanying claims.

I claim:

1. A tandem master cylinder for a vehicle hydraulic brake system comprising:
   a first pressure piston;
   a second pressure piston in line with and spaced from said first pressure piston;
   a first pressure chamber disposed between the adjacent ends of said first and second pressure pistons and coupled to a front wheel brake of one of two brake circuits;
   a second pressure chamber bounded by an end of said second pressure piston remote from said first pressure piston and coupled to a front wheel brake of the other of said two brake circuits;
   a first regulator controlling pressure communication between said first pressure chamber and a rear wheel brake of said one of said two brake circuits, said first regulator having a first stepped piston loaded by a first control spring and a first valve;
   a second regulator controlling pressure communication between said second pressure chamber and a rear wheel brake of said other of said two brake circuits, said second regulator having a second stepped piston loaded by a second control spring and a second valve; and
   means which, in the event of failure of either one of said one and said other of said two brake circuits, one of said first and second valves in the other of said two brake circuits is actuated mechanically by one of said first and second pressure pistons to thereby keep said one of said first and second valves in an open position.

2. A master cylinder according to claim 1, further including
   a housing including
      a smooth bore in which said first and second pressure pistons are disposed; and
   said first and second regulators are disposed in said housing.

3. A master cylinder according to claim 2, wherein said first and second pressure pistons and said first regulator are disposed in tandem in said bore.

4. A master cylinder according to claim 2, wherein said second regulator is disposed within said second pressure piston.

5. A master cylinder according to claim 4, wherein said first and second pressure pistons and said first regulator are disposed in tandem in said bore.

6. A master cylinder according to claim 5, wherein said means includes
   a first extension of said first pressure piston extending into said first pressure chamber, and
   a second extension of said second pressure piston extending into said second pressure chamber.

7. A master cylinder according to claim 6, wherein said first stepped piston is disposed in a sleeve disposed in said bore and secured to said housing.

8. A master cylinder according to claim 7, wherein said first valve includes
   the larger step of said first stepped piston shaped to provide a valve-closure member cooperating with a valve seat provided by a ring disposed adjacent the smaller step of said first stepped piston.

9. A master cylinder according to claim 8, wherein said first stepped piston includes
   a peg-shaped end extending from its smaller step into said second pressure chamber, and
   a stop means extending from its larger step to an end wall of said bore.

10. A master cylinder according to claim 8, wherein one surface of said ring provides a boundary for an outlet chamber of said first regulator and bears against an end wall of said bore through the intermediary of a spacer ring and the other surface of said ring bears against said sleeve through the intermediary of a washer and a spring.

11. A master cylinder according to claim 4, wherein said second pressure piston includes
   an annular chamber in permanent communication with the second pressure chamber.

12. A master cylinder according to claim 5, wherein said second pressure piston includes
   an annular chamber in permanent communication with the second pressure chamber.

13. A master cylinder according to claim 5, wherein said second valve is provided with a control device subjected to the pressure prevailing in said first pressure chamber.

14. A master cylinder according to claim 13, wherein said control device includes
   a blocking piston having one end adjacent said first pressure chamber, and
   a spring to load said blocking piston in opposition to its mechanical actuating direction.

15. A master cylinder according to claim 14, wherein said second valve is disposed internally of said second stepped piston and includes a tappet bearing against the other end of said blocking piston.

16. A master cylinder according to claim 15, wherein the maximum displacement travel of said second stepped piston is greater than the closure travel of said second valve, and
   the displacement travel of said blocking piston is greater than the difference between the maximum displacement travel of said sound stepped piston and the closing travel of said second valve.

17. A master cylinder according to claim 4, wherein said first stepped piston is disposed in a sleeve disposed in said bore and secured to said housing.

18. A master cylinder according to claim 17, wherein said first valve includes
   the larger step of said first stepped piston shaped to provide a valve-closure member cooperating with a valve seat provided by a ring disposed adjacent the smaller step of said first stepped piston.

19. A master cylinder according to claim 18, wherein said first stepped piston includes
   a peg-shaped end extending from its smaller step into said second pressure chamber, and
   a stop means extending from its larger step to an end wall of said bore.

20. A master cylinder according to claim 18, wherein one surface of said ring provides a boundary for an outlet chamber of said first regulator and bears against an end wall of said bore through the intermediary of a spacer ring and the other surface of said ring bears against said sleeve through the intermediary of a washer and a spring.

21. A master cylinder according to claim 1, wherein said means includes
   a first extension of said first pressure piston extending into said first pressure chamber, and
   a second extension of said second pressure piston extending into said second pressure chamber.

* * * * *